US005653931A

United States Patent [19]
Eibl et al.

[11] Patent Number: 5,653,931
[45] Date of Patent: Aug. 5, 1997

[54] PROCESS FOR THE PRODUCTION OF CELLULOSE MOULDED BODIES

[75] Inventors: Markus Eibl, Wolfurt; Heinrich Firgo, Vöcklabruck, both of Austria

[73] Assignee: Lenzing Aktiengesellschaft, Austria

[21] Appl. No.: 454,314

[22] PCT Filed: Dec. 9, 1994

[86] PCT No.: PCT/AT94/00192

§ 371 Date: Jun. 5, 1995

§ 102(e) Date: Jun. 5, 1995

[87] PCT Pub. No.: WO95/16063

PCT Pub. Date: Jun. 15, 1995

[30] Foreign Application Priority Data

Dec. 10, 1993 [AT] Austria ................. 2498/93

[51] Int. Cl.$^6$ ................. B29C 47/00; D01F 2/24
[52] U.S. Cl. ................. 264/187; 106/200.3; 264/233
[58] Field of Search ................. 264/187, 203, 264/207, 233; 106/200.3

[56] References Cited

U.S. PATENT DOCUMENTS

| | | | |
|---|---|---|---|
| 4,246,221 | 1/1981 | McCorsley, III | 264/203 |
| 4,261,943 | 4/1981 | McCorsley, III | 264/187 X |

FOREIGN PATENT DOCUMENTS

| | | |
|---|---|---|
| 356419 | 2/1990 | European Pat. Off.. |
| 538977 | 4/1993 | European Pat. Off.. |
| 286001 | 1/1991 | Germany. |
| WO92/07124 | 4/1992 | WIPO. |
| WO92/14871 | 9/1992 | WIPO. |
| WO94/24343 | 10/1994 | WIPO. |

OTHER PUBLICATIONS

M. Dubé and R.H. Blackwell, Tappi Proceeding, 1983, International Dissolving & Specialty Pulps, pp. 111–119.
Handbuch der Textilhilfsmittel, Verlag Chemie, 1977; ISBL 3–527–25367–X.

*Primary Examiner*—Leo B. Tentoni
*Attorney, Agent, or Firm*—Brumbaugh, Graves, Donohue & Raymond

[57] ABSTRACT

The invention is concerned with a process for the production of cellulose moulded bodies, particularly films and fibres, by extruding a solution of cellulose in a tertiary amine-oxide through a shaping device, for example a spinneret, and conducting the extruded moulded body while drawing it into an aqueous precipitation bath, in which it coagulates, whereafter the coagulated moulded body is washed with an aqueous washing liquid, characterized in that the precipitation bath employed for coagulation and/or the washing liquid employed for washing contain(s) a surfactant in dissolved form.

16 Claims, No Drawings

PROCESS FOR THE PRODUCTION OF CELLULOSE MOULDED BODIES

BACKGROUND OF THE INVENTION

The present invention is concerned with a process for the production of cellulose moulded bodies, in particular films and fibres, by extruding a solution of cellulose in a tertiary amine-oxide through a shaping device, e.g. a film forming gap, or through spinning holes of a spinneret, and conducting the extruded solution while drawing it into an aqueous precipitation bath, in which it coagulates, whereafter the coagulated moulded body is washed with an aqueous washing liquid. Furthermore, the present invention is concerned with a composition for moulding or spinning containing cellulose, a tertiary amine-oxide and a non-solvent, particularly water.

As an alternative to the viscose process, in recent years there has been described a number of processes in which cellulose, without derivatization, is dissolved in an organic solvent, a combination of an organic solvent and an inorganic salt, or in aqueous salt solutions. Cellulose fibres made from such solutions have received by BISFA (The International Bureau for the Standardisation of man made Fibres) the generic name Lyocell. As Lyocell, BISFA defines a cellulose fibre obtained by a spinning process from an organic solvent. By "organic solvent", BISFA understands a mixture of an organic chemical and water. "Solvent-spinning" is considered to mean dissolving and spinning without derivatization.

So far, however, only one process for the production of a cellulose fibre of the Lyocell type has achieved industrial-scale realization. In this process, N-methylmorpholine-N-oxide (NMMO) is used as a solvent. Such a process is described for instance in U.S. Pat. No. 4,246,221 and provides fibres which exhibit a high tensile strength, a high wet-modulus and a high loop strength.

However, the usefulness of plane fibre assemblies, for example fabrics, made from the above fibres, is significantly restricted by the pronounced tendency of the fibres to fibrillate when wet. Fibrillation means the breaking up of the fibre in longitudinal direction at mechanical stress in a wet condition, so that the fibre gets hairy, furry. A fabric made from these fibres and dyed significantly loses colour intensity as it is washed several times. Additionally, light stripes are formed at abrasion and crease edges. The reason for fibrillation (splicing) may be that the fibres consist of fibrils which are arranged in the longitudinal direction of the fibre axis and that there is only little crosslinking between these.

WO 92/14871 describes a process for the production of a fibre having a reduced tendency to fibrillation. The reduced tendency to fibrillation is attained by providing all the baths with which the fibre is contacted before the first drying with a maximum pH value of 8.5.

WO 92/07124 also describes a process for the production of a fibre having a reduced tendency to fibrillation, according to which the never dried fibre is treated with a cationic polymer. As such a polymer, a polymer with imidazole and azetidine groups is mentioned. Additionally, there may be carried out a treatment with an emulsifiable polymer, such as polyethylene or polyvinylacetate, or a crosslinking with glyoxal.

BRIEF DESCRIPTION OF THE PREFERRED EMBODIMENTS

According to EP-A - 0 538 977, the tendency to fibrillation of cellulose fibres can be reduced with bireactive dyes.

SUMMARY OF THE INVENTION

Further, it has been known already since 1983 that the tendency to fibrillation of fibres spun from an NMMO/cellulose-solution can be reduced by treating them with glyoxal (see M. Dubé and R. H. Blackwell, Tappi Proceedings 1983 International Dissolving and Speciality Pulps, pages 111–119).

SUMMARY OF THE INVENTION

It has been shown that the known cellulose moulded bodies, such as cellulose films and cellulose fibres, of the Lyocell type still leave something to be desired in terms of tendency to fibrillation, and thus it is the object of the present invention to provide a process for the production of cellulose moulded bodies, in particular cellulose films and cellulose fibres of the Lyocell type, having a further reduced tendency to fibrillation.

This objective is attained in a process of the type described above by carrying out the process in a way that the precipitation bath used for coagulation and/or the washing liquid used for washing contain(s) a surfactant in dissolved form.

It has been found surprisingly that films and fibres produced by coagulation of the dope (=composition for moulding or spinning) in surfactant-containing baths present a lower tendency to fibrillation than those which are coagulated in pure water or in a water/NMMO-solution. According to the invention, the best results are obtained when the moulded body is extruded into a surfactant-containing precipitation bath and washed free of NMMO using surfactant-containing water.

The improvement in the tendency to fibrillation is less significant when the fibre is spun into a surfactant-containing bath and washed free of NMMO using pure water, or is spun into water and washed free of NMMO using surfactant-containing water.

The term "surfactant" as used herein comprises all surface active compounds which present separate molecule areas of lipophile and hydrophile character (see Handbuch der Textilhilfsmittel, Verlag Chemie, 1977; ISBN 3-527-25367-X). For anionic, non-ionic and cationic surfactants, a positive influence on the tendency to fibrillation has been observed.

A preferred embodiment of the process according to the invention consists in that the surfactant dissolved in the precipitation bath and/or in the washing liquid is present in a concentration which is higher than the critical micelle formation concentration. To those skilled in the art, it is evident that the critical micelle formation concentration is not a given parameter, but depends on several factors such as temperature, electrolyte content etc., and that these factors naturally must be considered when adjusting the surfactant concentration.

Very good results are obtained when the surfactant dissolved in the precipitation bath and/or in the washing liquid is present in a concentration of from 0.01 to 5% by weight.

According to the process according to the invention, all known cellulose dopes containing a tertiary amine-oxide can be processed. Thus, these dopes may contain from 5 to 25% of cellulose. However, cellulose contents from 10 to 18% are preferred. As a raw material for the cellulose production, hard or soft wood can be used, and the polymerisation degrees of the cellulose(s) may be in the range of the commercial products commonly used in technics. It has been shown, however, that in case of a higher molecular weight of the cellulose, the spinning behaviour will be better. The spinning temperature may range, depending on the polymerisation degree of the cellulose and the solution concentration respectively, from 75° to 140° C., and may be optimized in a simple way for any cellulose and any concentration respectively. The draw ratio in the air gap depends, when the titer of the fibres is fixed, on the spinning hole diameter and on the cellulose concentration of the solution.

It has been shown further that cellulose films and fibres having a reduced tendency to fibrillation are also formed when using a cellulose solution which itself contains a surfactant. Accordingly, the present invention also refers to a process for the production of cellulose films and fibres by extruding a solution of cellulose in a tertiary amine-oxide through a shaping device and conducting the extruded solution while drawing it into an aqueous precipitation bath, in which it coagulates, whereafter the coagulated moulded body is washed with an aqueous washing liquid, characterized in that a cellulose solution containing a surfactant in a concentration of at least 0.5% by weight, based on the cellulose, is used. Compositions for moulding or spinning containing cellulose, an aqueous tertiary amine-oxide and a surfactant in a concentration of at least 0.5% by weight, based on the cellulose, are new.

It has been shown that with the dope according to the invention, the production of films and fibres having a reduced tendency to fibrillation is particularly good when the dope contains the surfactant in a maximum of 5% by weight, based on the cellulose.

In the composition for moulding or spinning according to the invention, the same or a different surfactant as in the precipitation bath and/or the washing waters may be contained.

In the following, the testing processes for the fibrillation evaluation and preferred embodiments of the invention will be described in more detail.

Dopes and spinning solutions respectively without surfactant addition were produced according to the process described in EP-A - 0 356 419, filed by the applicant, from a suspension of cellulose in an aqueous NMMO. In a modification of this process, spinning solutions with addition of a surfactant were produced in such a way that the surfactants were added to the cellulose suspension in an amount that the surfactant content specified for each case was attained in the obtained cellulose solution.

For the making of the fibres, a 12% spinning solution of sulfite-cellulose and sulfate-cellulose (12% water, 76% NMMO) was spun at a temperature of 115° C. As a spinning apparatus, a melt-flow index apparatus commonly employed in plastics processing of the company Davenport was used. This apparatus consists of a heated, temperature-controlled cylinder, into which the dope is filled. By means of a piston, to which a weight is applied, the dope was extruded through the spinneret provided at the bottom of the cylinder (spinning hole diameter: 100 μm; output: 0.03 g dope/min/hole; titer: 1.7 dtex). The spinning temperature was 115° C. This process is referred to as dry/wet-spinning process, since the extruded filament immerses, once it has passed a spinning gap (=air gap), into a precipitation bath.

Subsequently, the filaments coagulated in the precipitation bath were washed free of NMMO using an aqueous washing liquid and afterwards dried (12 hours at 60° C.). Then, the fibrillation properties of the dried fibres were analyzed.

Evaluation of fibrillation

The abrasion of the fibres among each other in washing processes and finishing processes in wet condition was simulated by the following test: each of 2 samples of 8 fibres each having a length of 2 cm was put into a 20 ml sample bottle with 2 ml of water and shaken during 3 hours in a laboratory mechanical shaker (RO-10 type of the company Gerhardt, Bonn (Germany); 50 Hz, 55 W 0.25 A) at stage 12.

After 9 hours of shaking time, the fibres were examined under the microscope and their tendency to splicing and splicing degree were determined. The average number of fibrils (average of 5 countings), which could be counted under the microscope on a fibre length of 276 μm, reveals the tendency to splicing (=fibrillation). The splicing degree reflects the type of fibrils. The following scale was employed to assign a splicing degree to the individual fibres:

| Splicing degree | Type of fibrils |
| --- | --- |
| 0 | = no fibrils |
| 1 | = fibrils with a length smaller than the fibre diameter |
| 2 | = uncurled fibrils with a length bigger than the fibre diameter |
| 3 | = partly curled fibrils |
| 4 | = fibrils start wrapping the fibre |
| 5 | = fibre is wrapped by fibrils |
| 6 | = whole fibre disintegrates into fibrils |

0–3 fibrils and a degree from 0 to 1 correspond to a fibre with reduced splicing, like Modal or Viscose.

EXAMPLES 1–7

Surfactants in the precipitation bath

According to the general procedure described above, cellulose solutions containing no surfactant were extruded across an air gap of 40 mm into various spinning baths containing each a different surfactant. Then the obtained coagulated filaments were washed with pure water or with surfactant-containing water, subsequently dried under the conditions indicated above and afterwards subjected to the test described above, in order to evaluate their fibrillation. The results are shown in the following Table, where in a first sample fibres were washed with pure water and in a second sample fibres were washed with surfactant-containing water. Where surfactants were used in the precipitation bath as well as in the washing water, these were identical, and also the applied concentration was identical.

TABLE 1

| | | Washing | | | |
| --- | --- | --- | --- | --- | --- |
| | | without surfactant | | with surfactant | |
| Example | Precipitation bath | Number | Degree | Number | Degree |
| Comp. | without surfactant | 48 | 4.5 | — | — |
| 1 | 1% BARLOX 12 ® | 17.5 | 3.6 | 8.0 | 2.5 |
| 2 | 1% GLUCOPAN 600 CS UP ® | 26 | 3.5 | 10.5 | 2.5 |
| 3 | 1% GLUCOPAN 225 ® | 16 | 2.8 | 8.0 | 2.12 |
| 4 | 1% LUTENSOL TO 20 ® | 23.5 | 3.3 | 6.0 | 2.0 |
| 5 | 1% VIP OIL AG 62 ® | 11.5 | 2.6 | 4.0 | 2.0 |
| 6 | 1% alkyl amine-oxide | 20 | 3.25 | 18.0 | 3.12 |
| 7 | 0,2% FLUOWET ® | 22 | 4,25 | 8,5 | 2,25 |

The terms indicated above in the column "precipitation bath" are trade names of surfactants (Barlox 12®: alkyl dimethyl amine-oxide, made by Lonza AG; GLUCOPON 600 CS UP®: Alkyl polyglycoside, made by Henkel; GLUCOPAN 225®: Fatty alcohol-C8-C10-glycoside, made by Henkel; LUTENSOL TO 20®: Fatty alcohol ethoxylate, made by BASF; VIP OIL AG 62®: Cocoamine-oxide, made by Giovanni Bozzetto; alkyl amine-oxide: Alkyl dimethylamine-oxide, made by Hoechst; FLUOWET®: water soluble fluorine surfactant, made by Hoechst.

The Comparative Example refers to a precipitation bath which contained no surfactant. For washing, pure water was employed.

When the precipitation bath contains a surfactant, all surfactants have a positive effect on the tendency to fibrillation, while particularly good results are obtained when surfactant-containing water is used for washing.

For example, by employing 1% VIP OIL AG 62® in the precipitation bath and washing water, a reduction in the number of fibrils from 48 (Comparative Example) to 4.0 and a reduction of the splicing degree from 4.5 (Comparative Example) to 2.0 is achieved (see Example 5).

EXAMPLES 8–13

No Surfactants in the Precipitation Bath

According to the general procedure described above, cellulose solutions containing no surfactant were extruded across an air gap of 40 mm into a spinning bath which also contained no surfactant. Then the obtained coagulated filaments were washed free of NMMO using pure water, subsequently washed in a wet condition with surfactant-containing water (finished) and dried. The results are indicated in the following Table 2.

TABLE 2

| Ex. | Finishing | Number | Degree |
|---|---|---|---|
| Comp. | without surfactant | >60 | 5.25 |
| 8 | 1% BARLOX 12 ® | >60 | 5.0 |
| 9 | 1% GLUCOPON 600 CS UP ® | 55 | 5.0 |
| 10 | 1% GLUCOPON 225 ® | >60 | 5.25 |
| 11 | 1% LUTENSOL TO 20 ® | 49 | 4.75 |
| 12 | 1% VIP OIL AG 70 ® | >60 | 5.0 |
| 13 | 0,2% FLUOWET ® | >60 | 5.0 |

In the Comparative Example, no finishing with surfactant was carried out.

From Table 2 it can be seen that when no surfactant is present in the dope and in the precipitation bath, the filaments are washed free of NMMO using pure water and finished with surfactant-containing water, the improvement in the tendency to splicing is not as significant as in Table 1.

Surfactants in the dope and/or bath and washing liquid

According to the above procedure, several dopes containing 12% by weight of cellulose (DP aprox. 500) and 4.15% by weight, based on cellulose, of surfactant, (see Table 3; the percentages given in Table 3 refer each to the total masses (dope, precipitation bath, washing liquid); thus, 0.5% of surfactant, based on the total dope, means 4.15%, based on cellulose) were produced and spun as described above. Depending on the presence of a surfactant in the bath and on the presence of a surfactant in the washing liquid, the following results were obtained by means of the described splicing test after drying the fibres.

TABLE 3

| Dope | Precipitation bath | Washing | A | N |
|---|---|---|---|---|
| no surfactant | no surfactant | no surfactant | 34 | 4.0 |
| 0.5% LUTENSOL TO 20 ® | no surfactant | no surfactant | 29 | 3.75 |
| no surfactant | 1% LUTENSOL TO 20 ® | 1% LUTENSOL TO 20 ® | 10 | 3.0 |
| no surfactant | 1% GENAMINOX CST ® | 1% GENAMINOX CST ® | 22 | 3.5 |
| 0.5% LUTENSOL TO 20 ® | 1% LUTENSOL TO 20 ® | 1% LUTENSOL TO 20 ® | 11 | 2.5 |
| 0.5% LUTENSOL TO 20 ® | 1% GENAMINOX CST ® | 1% GENAMINOX CST ® | 23 | 3.25 |
| 0.5% LUTENSOL TO 20 ® | no surfactant | 0,5% LUTENSOL TO 50 ® | 25 | 3.6 |
| 0.5% FLUOWET ® | 1% LUTENSOL TO 20 ® | 1% LUTENSOL TO 20 ® | 8 | 2.0 |
| 0.5% FLUOWET ® | 1% GENAMINOX CST ® | 1% GENAMINOX CST ® | 18 | 3.5 |
| 0.5% PRAEPAGEN WK ® | no surfactant | no surfactant | 21 | 3.5 |
| 0.5% PRAEPAGEN WK ® | 1% PRAEPAGEN WK ® | 1% PRAEPAGEN WK ® | 18 | 3.0 |

Washing=washing liquid; A=tendency to splicing,; N=splicing degree; GENAMINOX® is an alkyl dimethylamine-oxide made by the company Hoechst; PRAEPAGEN® is an alkyl ammonium salt made by the company Hoechst; the other trade names indicated above have been described in more detail already with reference to Table 1.

From Table 3 it can be seen that the best results with respect to the tendency to splicing are obtained when surfactants are contained in the dope as well as in the precipitation bath and in the washing liquid.

The above Examples were carried out also with anionic surfactants, for example the sodium salts of dodecylsulfate and dioctylsulfosuccinate, obtaining practically the same results.

We claim:

1. A process for preparing a cellulose molded body comprising the steps of:
   a) extruding a solution of cellulose in a tertiary amine-oxide through a shaping device,
   b) conducting the shaped cellulose solution into an aqueous precipitation bath, thereby precipitating a cellulose molded body, wherein the precipitation bath comprises a solubilized surfactant, and
   c) washing the cellulose molded body with an aqueous washing liquid.

2. A process for preparing a cellulose molded body comprising the steps of:
   a) extruding a solution of cellulose in a tertiary amine-oxide through a shaping device,
   b) conducting the shaped cellulose solution into an aqueous precipitation bath, thereby precipitating a cellulose molded body, and
   c) washing the cellulose molded body with an aqueous washing liquid, wherein the aqueous washing liquid comprises a solubilized surfactant.

3. A process for preparing a cellulose molded body according to claim 1, wherein the aqueous washing liquid comprises a solubilized surfactant.

4. A process according to claim 1, wherein the concentration of surfactant in the precipitation bath is higher than the critical micelle concentration for the surfactant.

5. A process according to claim 2, wherein the concentration of surfactant in the aqueous washing liquid is higher than the critical micelle concentration of the surfactant.

6. A process according to claim 3, wherein the concentrations of surfactant in the precipitation bath and in the aqueous washing liquid are both higher than the critical micelle concentration of the surfactant.

7. A process according to claim 4, wherein the concentration of surfactant in the precipitation bath is from 0.01 to 5% by weight.

8. A process according to claim 5, wherein the concentration of surfactant in the aqueous washing liquid is from 0.01 to 5% by weight.

9. A process according to claim 6, wherein the concentration of surfactant in the precipitation bath is from 0.01 to 5% by weight, and wherein the concentration of the surfactant in the aqueous washing liquid is from 0.01 to 5% by weight.

10. A process according to any one of claims 1, 2, 3, 4, 5, 6, 7, 8 or 9, wherein the surfactant is selected from the group consisting of alkyl amine-oxides, alkyl glycoside, alkyl ethoxylate and water soluble fluorine containing surfactants.

11. A process as in any one of claims 1, 2, 3, 4, 5, 6, 7, 8 or 9, wherein the solution of cellulose further comprises a surfactant.

12. A process according to claim 10, wherein the solution of cellulose further comprises a surfactant.

13. A process according to claim 1, wherein the solution of cellulose in tertiary amine-oxide further comprises a surfactant in an amount of at least 0.5% by weight of cellulose.

14. A process according to claim 13, wherein the surfactant in the solution of cellulose in tertiary amine-oxide is selected from the group consisting of alkyl amine-oxides, alkyl glycoside, alkyl ethoxylate and water soluble fluorine-containing surfactants.

15. A process according to claim 1 wherein the solution of cellulose in tertiary amine-oxide further comprises a surfactant in an amount of at least 5% by weight of cellulose.

16. A process according to claim 15, wherein the surfactant in the solution of cellulose in tertiary amine-oxide is selected from the group consisting of alkyl amine-oxides, alkyl glycoside, alkyl ethoxylate and water soluble fluorine-containing surfactants.

* * * * *

UNITED STATES PATENT AND TRADEMARK OFFICE
CERTIFICATE OF CORRECTION

PATENT NO. : 5,653,931

DATED : August 5, 1997

INVENTOR(S) : Markus Eibl and Heinrich Firgo

It is certified that error appears in the above-identified patent and that said Letters Patent is hereby corrected as shown below:

Col. 2, line 1, delete "SUMMARY OF THE INVENTION";
Col. 3, line 22, "Compositions for. . . " should start a new paragraph;
Col. 4, line 57, "GLUCOPAN" should read --GLUCOPON--;
Col. 4, line 59, "GLUCOPAN" should read --GLUCOPON--;
Col. 5, bridging lines 2-3, "GLUCOPAN" should read --GLUCOPON--; and,
Col. 6, line 34, "GENAMINOX®" should read --GENAMINOX CST®--.

Signed and Sealed this

Sixteenth Day of December, 1997

Attest:

BRUCE LEHMAN

Attesting Officer

Commissioner of Patents and Trademarks